O. D. HOGUE.
HUMIDIFYING APPARATUS.
APPLICATION FILED JAN. 6, 1922.

1,430,548.

Patented Oct. 3, 1922.

Inventor
Oliver D. Hogue,
by Wilkinson & Giesta,
Attorneys

Patented Oct. 3, 1922.

1,430,548

UNITED STATES PATENT OFFICE.

OLIVER D. HOGUE, OF BROOKLINE, MASSACHUSETTS.

HUMIDIFYING APPARATUS.

Application filed January 6, 1922. Serial No. 527,480.

*To all whom it may concern:*

Be it known that I, OLIVER D. HOGUE, a citizen of the United States, residing at Brookline, in the county of Norfolk and State of Massachusetts, have invented certain new and useful Improvements in Humidifying Apparatus; and I do hereby declare the following to be a full, clear, and exact description of the invention, such as will enable others skilled in the art to which it appertains to make and use the same.

My present invention is a novel and improved humidifying apparatus intended for household, office or factory use, and is preferably designed as a complete humidifying unit, either portable or fixed, and operated by a heating element, preferably electrical.

Important features of the invention are to provide a complete humidifying unit or apparatus with a capacity suitable for a room, house, building or enclosure, as desired, and of a compact form, attractive appearance and ease in operating which will render the same specially suitable for household use. By utilizing a heating element, preferably electrical, my humidifying unit can be operated to supply needed moisture in the atmosphere or to maintain the same at a hygienic and healthful living or working condition. The usefulness and advantage of my humidifying device is of especial importance in connection with counteracting the drying and unhealthful conditions in buildings, schools, residences and factories, due to artificial heating, during cold weather or winters. Such artificial heating, whether from steam, hot water or hot air furnaces, results in drying out the air, exhausting the vitality, and creating an undesirable condition, either for living or working conditions, as well, also, as damaging furniture, pianos, etc., as well, also, as necessitating the burning of excess fuel to supply heat to devitalized and excessively dried air. My humidifying unit counteracts and obviates such difficulties, and being compact, economical and readily operable at a trifling expense, can be used to create an ideally perfect climatic hygienic condition in the house, room or building by supplying the needed humidity to the atmosphere.

In carrying out my invention I preferably utilize a complete humidifying unit, consisting in a moisture containing receptacle of substantial capacity—preferably sufficient to supply a day's consumption of moisture for the particular work and apparatus desired—and in connection with said supply I provide a vaporizing or evaporating chamber or receptacle to which a relatively small and inexpensive heat supply would cause the vaporizing of the humidifying liquid. My apparatus, therefore, includes a liquid supply or reservoir of relatively large or predetermined capacity, a relatively small evaporating chamber or container, and a suitable heating element for the evaporating chamber, thus enabling an inexpensive heat supply to effect the operation of the apparatus. Suitable means connecting the supply reservoir with the vaporizing chamber or receptacle are provided, which means may be and preferably is of a type to maintain a predetermined water level in the vaporizing portion of the apparatus. Thus I am enabled to produce a humidifying unit which will operate all day or to a predetermined extent without attention or refilling, and will be operable by a heating element, electrical or otherwise, which will be of minimum and negligible cost.

Preferably I provide my unit of so compact and efficient a structure that it is portable and can be readily moved, placed or positioned at any convenient point, attached to a register, fitted under a table, or in any other position throughout the house, room or building.

An important advantage of the apparatus is that it can be utilized advantageously as a disinfecting and fumigating means. Thus by adding any desired article, perfume, disinfectant, germ killing or other chemical to the liquid supply or to the vaporizing part of the apparatus, the diffusion of the liquid throughout the atmosphere will equally carry the perfuming, disinfectant or remedial chemical. The affinity of the atmosphere for absorbing humidity is well known and will be pointed out in further detail hereafter.

Additional features, novelties and advantages will also be further explained and claimed.

With these and other objects in view the invention consists in the novel details of construction and combinations of parts more fully hereinafter disclosed and particularly pointed out in the claims.

Referring to the accompanying drawings forming part of this specification, in which like numerals designate like parts in all the views.

Figure 1:
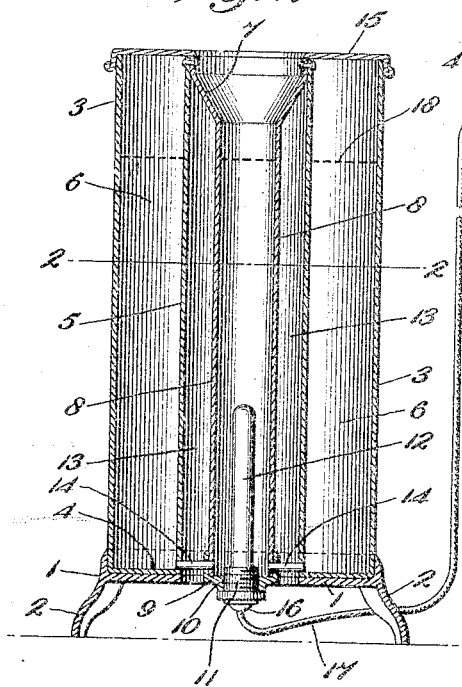
Figure 1 is a central vertical sectional view of an electric humidifier made in accordance with the present invention.
Figure 2:
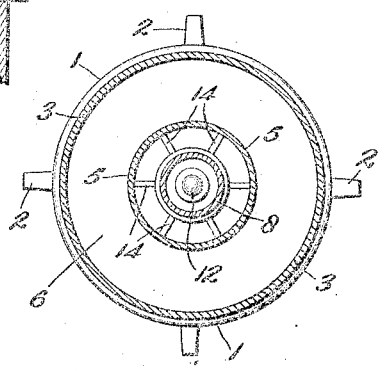
Figure 2 is a cross sectional view of the parts shown in Fig. 1, taken on the line 2—2 of the said figure and looking down.

Referring more especially to Figs. 1 and 2, 1 indicates a base, preferably circular or annular in form, provided with the legs or supports 2 and upon which rests the cylindrical receptacle 3 preferably formed of sheet metal. Said receptacle 3 is provided with the bottom 4 and with the central tubular member 5 extending substantially the full height of the said receptacle, thus forming an annular space 6 which is adapted to receive and hold water as will more fully appear below. Secured to the upper portion of the said tubular member 5 is the flared end 7 of a second tube 8 which likewise extends substantially the full height of the receptacle 3, and the said tube 8 is closed at its lower end by a cap 9 which is provided with a threaded opening 10 adapted to receive the threaded portion 11 of an electric resistance element 12 of any suitable construction.

The tube 8 is of somewhat less diameter than the tubular member 5 thereby providing an annular space 13 between the two and at the lower portion of this annular space there is provided a plurality of pipe connections 14 between the annular space 6 and the interior of the said tube 8, whereby water contained in the said space 6 may flow into the said tube 8, as will be clear from Fig. 1. A cap or cover 15 may be employed to close the upper portion of the receptacle 3 and a detachable plug 16 provided with the electric cable 17 may be inserted in suitable holes or openings provided in the portion 11 of the resistance element 12. This cable 17 may be supplied with electricity from any convenient source, and controlled from a distant point if desired, such as the wall switch 40, attached to the wall 41, or it may be connected to any convenient lamp socket.

The operation of this form of the device will be clear from the foregoing but it may be briefly summarized as follows:

When it is desired to increase the moisture content of the air within a room or other enclosed space, water may be introduced into the annular space 6 within the receptacle 3 by removing the cover 15 and pouring it therein, whereupon it will find its way through the pipe connections 14 into the interior of the tube 8 and will rise to a level such as that indicated by the dotted line 18 in Fig. 1. The cover 15 now being replaced and the electric current being turned on the latter will flow through the resistance element 12 which is shown in direct contact with the water in the tube 8, but which may be arranged in any other treating position desired. The said resistance element will of course become highly heated thereby causing the said water within the tube 8 to evaporate quite rapidly. This evaporation will cause the moisture in the air within a room or other space to increase, with the result that within a short time after the electric current is turned on, any desired degree of humidity may be obtained. The annular space 13 which, it will be noted is open to the atmosphere to the bottom, serves as an air space and insulator to prevent the overheating of the apparatus.

Figure 3:
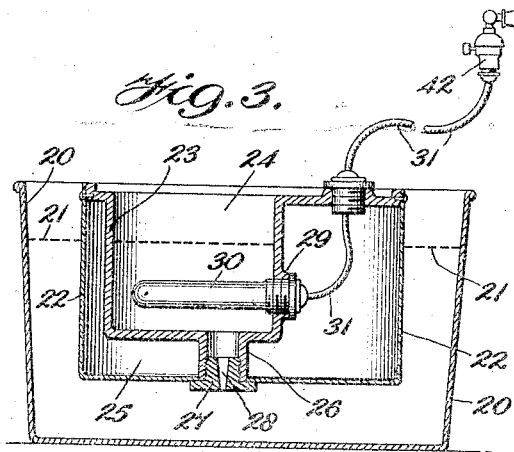
Figure 3 is a central vertical sectional view of a slightly modified form of the device.
Figure 4:
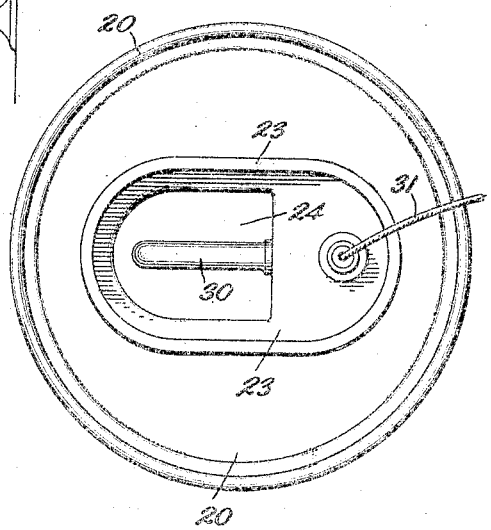
Figure 4 is a plan view of the parts shown in Fig. 3.

The form of the apparatus shown in Figs. 3 and 4 operates in substantially the same manner, but its construction is different in that it is designed to be used with any receptacle for holding water which may be available; that is to say, any suitable pan or receptacle 20 may be provided which may be filled with water up to the level indicated by the dotted line 21, whereupon the vaporizing or evaporating portion may be placed therein, thus constituting a complete humidifying apparatus with a relatively large reservoir of liquid and a separate vaporizing and heating portion. This form of the humidifier consists of a thin outer shell 22 of any desired shape to which is secured an inner shell 23 providing a chamber 24 open to the atmosphere and a chamber 25 which is substantially air tight and serves to buoy up the apparatus causing it to float in the water within the pan 20. This arrangement, wherein the water level is maintained in the vaporizing and evaporating or heating portion throughout the use of the apparatus, is of very great importance, as I find that greatly increased efficiency is obtainable by maintaining the water level substantially uniform throughout the heating element. This enables me to supply just the most efficient combination of heating element and the volume of water in heat receiving contact therewith, for even vaporizing at all times, and with a relatively minimum expense for the electrical heating element. In fact I prefer to utilize this form in practice, rather than that illustrated in Figs. 1 and 2. The shell 23 is preferably provided with a boss 26 into which is threaded a plug member 27 having an opening or passage 28 communicating with the exterior of the shell 22, whereby water may be admitted from the pan 20 into the chamber 24 as will be readily apparent. The said shell 23 is also provided with a second boss 29 into which may be threaded a resistance element 30 similar to the element 12 above described, and the electric current may be led to the said element by means of the wires 31 or in any other desired manner. The cable 31 may be supplied with current from a distant point, if desired, such as the lamp socket 42. As above stated, the operation of this form of the device is substantially the same as that above set forth in connection with Figs. 1 and 2 and it therefore need not be repeated.

In both forms it will be readily appreciated that I have provided a complete humidifying unit, preferably portable, and preferably also adapted for operation with a minimum amount of electric current and hence of negligible expense. Numerous modifications will readily occur to those skilled in the several arts involved, in addition to the two examples herein illustrated. In my development of humidifying apparatus, I find that it is entirely feasible to create an ideal indoor climatic and hygienic condition, by maintaining the indoor atmosphere with a proper and proportionate amount of humidity, substantially equivalent to a perfect outdoor spring or summer day temperature and moisture. When it is appreciated that the most comfortable living, working and healthful conditions in outdoor temperature, are between 65° and 75° F., together with humidities of between 55% and 65% of saturation, it will be appreciated that my humidifying apparatus, by maintaining this desired degree of humidity, will automatically change an unhealthful indoor condition with vitiated air into a healthful and ideally desired atmospheric condition. I find also that at the above desired temperatures and percentages of humidity, the air has a moisture content of from four to four and a half grains of free water per cubic foot. The air has a continuous affinity for absorbing moisture up to its saturation point at any predetermined temperature, and by utilizing a continuous supply of moisture in finely divided form, as given out by my humidifying apparatus, at the vaporizing portion, the humidity of an enclosed space, such as in a room, or building, is very quickly brought up and easily maintained in an ideally perfect humidifying condition. As the air itself continuously and almost instantly seeks to establish and maintain a perfect hydrostatic balance throughout the entire extent of the confined area either imparting moisture to people or articles in the enclosed area, or absorbing it from them, the necessity of artificial humidification when steam or hot air heat is being supplied, will be most apparent. Furthermore, dry air is a poor conductor of heat, while water is an excellent heat conductor, and therefore a properly humidified atmosphere will quickly and more easily become heated to a satisfactory personal temperature and in fact an enclosed space with a high degree of humidity affords an infinitely more comfortable and working condition than a drier atmosphere with a higher degree of heat. Thus, for example 70° F. temperature with three grains of moisture per cubic foot results in a sensible heat of about 55° F. or too chilly for comfort, living or working conditions. On the contrary, a 70° F. temperature with four and a half grains of moisture per cubic foot of air results in a sensible heat of 61° F., or an ideal working condition. Numerous other similar examples establish the fact that with a proper proportion of humidity contained in the atmosphere, especially indoor atmosphere, a resulting or sensible heat for living or working conditions is reached with lower temperature than where dry and high heat is found.

While I am aware that it has been attempted to provide humidity for indoor temperatures by allowing basins of water to stand and evaporate at the normal room temperature, by attachments to steam and hot water radiators, or the like, I believe that my invention of a humidifying unit containing a liquid supply and positive humidifying or vaporizing means controllable at will and operable for any predetermined extent, is new and I therefore wish to claim the same broadly. Also such a humidifying unit or apparatus, whether or not a heating element is employed as the positive vaporizing or evaporating means, in combination with a suitable liquid supply as a part of the unit or apparatus is, I am advised, novel and therefore I claim the same broadly. I also wish to claim hereafter, broadly, the combination of a relatively large liquid supply, a relatively small vaporizing chamber, together with means connecting the liquid supply with the vaporizing chamber, either for continuous feed of liquid and to maintain a predetermined level or otherwise, this feature I believe being broadly new and giving me the important benefits of utilizing a minimum amount of heat generation as the positive vaporizing means.

Having thus described my invention what I claim and desire to secure by Letters Patent of the United States is:—

1. A humidifying unit, comprising a liquid supplying receptacle, a vaporizing receptacle, a connection between said receptacles, and a positively vaporizing element operating in a vaporizing portion.

2. A humidifying unit, comprising a liquid supplying receptacle, a vaporizing receptacle, a connection between said receptacles, and a heating element operating in the vaporizing portion.

3. A humidifying unit, comprising a liquid supplying receptacle of relatively large capacity, a vaporizing portion of relatively small capacity, means connecting the same, and positively acting vaporizing means in combination with said vaporizing portion.

4. A humidifying unit, comprising a liquid supplying receptacle of relatively large capacity, a vaporizing portion of relatively small capacity, means connecting the same, and positively acting vaporizing means in combination only with said vaporizing portion.

5. A humidifying unit, comprising a liquid supplying receptacle of relatively large capacity, a vaporizing portion of relatively small capacity, means connecting the same, constructed and arranged to maintain a substantially predetermined liquid level in the vaporizing portion, and positively acting vaporizing means in combination with said vaporizing portion.

6. A humidifying unit, comprising a liquid supplying receptacle of relatively large capacity, a vaporizing portion of relatively small capacity, means connecting the same, constructed and arranged to maintain a substantially predetermined liquid level in the vaporizing portion, and positively acting vaporizing means in combination with said vaporizing portion, and a heating element operating in the vaporizing portion.

7. Humidifying apparatus comprising a liquid supply, an evaporating receptacle, means connecting the liquid supply with said receptacle, and means adapted to maintain a constant feed and a predetermined level.

8. Humidifying apparatus comprising a liquid supply, an evaporating receptacle, means connecting the liquid supply with said receptacle, and means adapted to maintain a predetermined level in combination with heating means applied to the liquid in said receptacle.

9. Humidifying apparatus comprising a source of liquid supply of relatively large capacity, an evaporating receptacle of relatively small capacity, means connecting said receptacle with the liquid supply arranged to automatically maintain a predetermined quantity of the liquid in the evaporating receptacle, and means to supply heat to said receptacle to maintain evaporation therefrom.

10. Humidifying apparatus comprising a source of liquid supply of relatively large capacity, an evaporating receptacle of relatively small capacity, means connecting said receptacle with the liquid supply arranged to automatically maintain a predetermined quantity of the liquid in the evaporating receptacle, and means to supply electric heat to said receptacle to maintain evaporation therefrom.

11. Humidifying apparatus suitable for use in a room, dwelling, office, apartment or the like, consisting in a supply receptacle, an evaporating reservoir, said reservoir being constructed and arranged to receive a continuous supply from the supplying receptacle, and of predetermined evaporating capacity for a minimum generation of heat, means to supply heat to said reservoir and means connecting the reservoir and the supply, whereby a substantially continuous evaporation in predetermined volume will be effected from said reservoir, irrespective of the quantity of liquid in the supplying receptacle.

12. Humidifying apparatus consisting in an evaporating receptacle, heating means in combination with said receptacle proportioned to secure a predetermined volume of evaporation for the amount of heat supplied, and means to supply liquid to said receptacle in a continuous and automatic manner proportioned to the evaporating capacity of the receptacle and its heating element.

13. In a device of the class described, the combination of a receptacle adapted to contain a liquid, a second receptacle in restricted communication with said first receptacle, and means associated with said receptacles adapted to cause the evaporation of the liquid contained therein.

14. In a device of the class described the combination of a receptacle adapted to contain a liquid, a second receptacle in restricted communication with said first receptacle, and adapted to be fed therefrom; and means within one of said receptacles and in direct contact with the liquid therein, adapted to cause the evaporation of said liquid.

15. In a device of the class described the combination of a receptacle adapted to contain a liquid, a second receptacle in restricted communication with said first receptacle, and adapted to be fed therefrom, and electric heating means within one of said receptacles and in direct contact with the liquid therein, adapted to cause the evaporation of said liquid.

16. In a device of the class described the combination of a receptacle adapted to contain a liquid, a second receptacle associated with said first receptacle in spaced relation thereto and in restricted communication therewith, and electric heating means mounted within said second receptacle in direct contact with the liquid therein, adapted to cause the evaporation of said liquid.

17. In a device of the class described the combination of a receptacle adapted to contain a liquid, a second receptacle also adapted to contain a liquid, a casing associated with said second receptacle providing an air tight insulating air chamber around said second receptacle, adapted to float the same on the liquid contained in said first receptacle, connections between said first and second receptacles, and means for causing the evaporation of the liquid contained in said receptacles.

18. In a device of the class described the combination of a receptacle adapted to contain a liquid, a second receptacle also adapted to contain a liquid, a casing associated with said second receptacle providing an air tight insulating air chamber around said second receptacle, adapted to float the same on the liquid contained in said first receptacle, connections between said first and second receptacles for permitting liquid to flow from one to the other, and electric heating means for causing the evaporation of the liquid contained in said receptacles.

19. In a device of the class described the combination of a receptacle adapted to contain a liquid, a casing associated with said receptacle and held in spaced relation thereto, to provide an air tight insulating chamber adapted to float the same upon a body of liquid, means for admitting said liquid to said receptacle, and an electric heating element in said receptacle in direct contact with the liquid therein, adapted to cause the evaporation of said liquid.

OLIVER D. HOGUE.